3,793,274
PROCESS FOR PROCESSING POLYVINYL
CHLORIDE RESIN
Osamu Hiyama, Yasuhiro Torimae, Kazuo Ito, and Yoshio Kawahara, Wakayama, Japan, assignors to Kao Soap Co., Ltd., Chuo-ku, Tokyo, Japan
No Drawing. Filed Aug. 19, 1971, Ser. No. 173,285
Claims priority, application Japan, Aug. 25, 1970, 45/74,431
Int. Cl. C08f 19/14, 21/04
U.S. Cl. 260—23 XA 3 Claims

ABSTRACT OF THE DISCLOSURE

The release properties of polyvinyl chloride resin are improved by incorporating therein a total of from 0.05 to 2.0 percent by weight of one or more materials selected from the group consisting of polymerized fatty acid, hydrogenated polymerized acid and polymerized fatty alcohols.

BACKGROUND OF THE INVENTION

Field of the invention

The invention relates to a process for processing polyvinyl chloride resin in which the processability of polyvinyl chloride resin is improved by blending therewith at least one component selected from the group consisting of polymerized fatty acids, hydrogenated polymerized fatty acids, and polymerized fatty alcohols to give said resin excellent lubricity and releasing property.

Description of the prior art

It is known to add heat stabilizers to polyvinyl chloride resin for molding purposes. Most heat stabilizers also have more or less lubricity, but in practice said property is not generally sufficient for practical processing, and in such cases lubricants are also used in the molding composition for obtaining satisfactory lubricity.

As lubricants for polyvinyl chloride resin, heretofore there have been used monobasic higher alcohols or their esters, amides such as methylene-bis-stearoamide, ketone waxes such as stearon and other various waxes. However, many of these conventional known lubricants are not completely satisfactory, for example, they dissolve excessively in the resin under the processing conditions of high temperature for a prolonged time, so that an adequate lubricant film cannot be formed between the resin and the metallic surface of the molding machine, and thus, they cannot produce a satisfactory releasing effect.

SUMMARY OF THE INVENTION

We have investigated extensively to find an excellent lubricant free from the defects described above, and have discovered that by blending polyvinyl chloride resin with, as a lubricant, at least one component selected from the group consisting of polymerized fatty acids, hydrogenated polymerized fatty acids, and polymerized fatty alcohols and molding the resin, the resin composition shows a good durable lubricity even under processing conditions of high temperature for a prolonged time and a good releasing property is obtained.

DETAILED DESCRIPTION OF THE INVENTION

This invention relates to a process for preparing a polyvinyl chloride resin composition having an excellent releasing property, characterized by adding to a resin composition consisting mainly of polyvinyl chloride resin at least one component selected from the group consisting of (a) polymerized fatty acids consisting mainly of dimers manufactured by polymerizing monobasic fatty acids having 8–24 carbon atoms, (b) hydrogenated polymerized fatty acids manufactured by hydrogenating the above-described polymerized fatty acids, and (c) polymerized fatty alcohols consisting essentially of dimers of alcohols having 8 to 24 carbon atoms, to a resin composition consisting mainly of polyvinyl chloride resin.

The polymerized fatty acids to be used in this invention may be the same acids that are employed in the method for manufacturing known modified polyamide resin: (refer to Japanese patent publication Nos. 10,068/1965 and 20,997/1969, for example). The products readily available on the market are those which are produced by dimerizing unsaturated fatty acids contained in natural oils (soybean oil, cottonseed oil, linseed oil, rape seed oil, dehydrated castor oil, safflower oil and beef tallow), and they usually contain small amounts of trimers by-produced in the dimer formation reaction and, also, unreacted monomers.

Considering the availability and ease of polymerization, it is preferable to employ polymerized fatty acids produced from starting materials of $C_{18}$ unsaturated fatty acids such as oleic acid and linoleic acid.

A typical composition of a polymerized fatty acid produced by polymerization of an unsaturated fatty acid of $C_{18}$ is composed of about 5–15 percent by weight of monomer acid of $C_{18}$, about 60–80 percent by weight of dimer acid of $C_{36}$ and about 10–35 pecent by weight of trimer acid of $C_{54}$. The composition can be fractionated by high vacuum distillation or solvent extraction, and the dimer acid cut, having a dimer acid concentration higher than a required level, can be separated.

It is particularly preferable to use polymerized fatty acids which are obtained by removing the monomers by distillation from mixtures consisting mainly of dimers produced by heat polymerization of unsaturated fatty acids in the presence or absence of catalysts. There may be used polymerized fatty acids which are produced by polymerizing a starting material of $C_1$–$C_4$ alkyl esters of unsaturated acids and then hydrolyzing. Polymerized fatty acids produced from saturated fatty acids may be similarly used, though they are not so important industrially due to the low yield in the reaction.

The hydrogenated polymerized fatty acids to be used in this invention are produced by hydrogenating such polymerized fatty acids as described above by a conventional process to convert the double bond between carbon atoms to a single bond. There may also be used similarly hydrogenated polymerized fatty acids prepared by hydrogenating and hydrolyzing polymerized fatty acid esters.

The polymerized fatty alcohols to be used in this invention are prepared by reducing polymerized fatty acids mainly consisting of dimers or by polymerizing unsaturated fatty alcohols according to the same process as that used for manufacturing the polymerized fatty acids.

The resins to which the aforementioned lubricity agents of this invention are added are so-called vinyl chloride resins containing at least 50 percent by weight of polyvinyl chloride, such as polyvinyl chloride resin, vinyl chloride-vinyl ester copolymers, vinyl chloride-vinyl ether copolymers, vinyl chloride-vinylidene chloride copolymers, and vinyl chloride-lower olefin copolymers. There may also be exemplified blends of polyvinyl chloride resins as the main component with other polymers such as MBS resin (methyl-methacrylate-butadiene - styrene synthetic rubber), ABS resin, styrene-acrylonitrile copolymer, and polystyrene.

The amount of polymerized fatty acid, hydrogenated polymerized fatty acid, and/or polymerized fatty alcohols added to the resin is preferably in the range of 0.05–2.0 percent by weight, based on the weight of the resin used. When the amount added is less than 0.05 percent by weight, effective results cannot be expected and when the amount added is higher than 2.0 percent by weight the obtained effect is not improved, and consequently the cost is increased without any corresponding benefit.

This invention provides an advantageous process for processing polyvinyl chloride resin, in which the resin can undergo rigorous processing conditions such as high temperature and prolonged processing period and still show durable lubricity. These properties have been earnestly sought, particularly in the calendering and extruding fields, for many years. According to the present invention, the resin does not stick to the metallic surfaces of the processing or molding machine, so it is readily released from a mold and can be smoothly processed.

The properties of lubricants are conventionally evaluated by various plastometers. According to such a method, the internal lubricating activity, which is one of the activities of a lubricant, can be exactly observed, but the releasing effect cannot be evaluated at all. In the example of this invention set forth hereinafter, a test roll method was employed to determine the releasing effect, so that the releasing effect could be accurately observed.

Example

There was employed a pair of hard chromium plated test rolls having a diameter of 2.5 inches, a length of 5 inches, a rotational ratio of ⅞, a clearance of 2 mm., and an electrically heated surface at 205° C. After each resin specimen, described below, was melted and attached to said heated rolls, the resin was peeled off periodically with a bamboo spatula. The time period (min.) was determined from the start of the test until there occurred the conditions (A) the stickiness of the resin to the roll increased so as to require some effort to peel off the resin and (B) the stickiness increased extraordinarily so as to make it difficult to peel off the resin.

A polyvinyl chloride resin and a blend of polyvinyl chloride resin and MBS resin (methylmethacrylate-butadiene-styrene synthetic rubber) were used as the starting resins, to which various lubricants were added to prepare test specimens.

The polymerized fatty acid used in the example was prepared by isomerizing safflower oil fatty acid methyl ester with an alkaline catalyst to make a conjugated fatty acid, polymerizing same by heating at 300° C. for 20 hours without any catalyst, and then removing most of unreacted monomer acid by distillation. As the hydrogenated polymerized fatty acid, there was used a product prepared by heating the abovedescribed polymerized fatty acid together with hydrogen in the presence of a nickel catalyst at 200° C. under 50 atm. for 10 hours. As the polymerized fatty alcohol, there was used a product prepared by heating a polymerized fatty acid methylester with hydrogen at a pressure of 150 atm. at 250° C. in the presence of a copper-chromium catalyst for 10 hours to remove volatile components. The polyvinyl chloride resin used was a rigid polyvinyl chloride having a polymerization degree of about 800, prepared by suspension polymerization.

The results of the tests are shown in Tables 1, 2 and 3.

TABLE 1

|  | Control | | Example | | |
|---|---|---|---|---|---|
| Number of sample | 1 | 2 | 3 | 4 | 5 |
| Composition of sample (g.): | | | | | |
| Polyvinyl chloride resin | 100 | 100 | 100 | 100 | 100 |
| Dibutyl tin dimaleate (stabilizer) | 3 | 3 | 3 | 3 | 3 |
| Butyl stearate | 0.5 | 0.5 | 0.5 | 0.5 | 0.5 |
| Stearic acid | 0.5 | | | | |
| Stearyl alcohol | | | 0.3 | | |
| Polymerized fatty acid | | | | 0.3 | |
| Hydrogenated polymerized fatty acid | | | | | 0.3 |
| Polymerized fatty alcohol | | | | | 0.3 |
| Time till condition (A) occurred (min.) | <1 | <1 | 12 | 15 | 8 |
| Time till condition (B) occurred (min.) | <1 | <1 | 35 | 41 | 22 |

TABLE 2

|  | Control | | Example | | |
|---|---|---|---|---|---|
| Number of sample | 6 | 7 | 8 | 9 | 10 |
| Composition of sample (g.): | | | | | |
| Polyvinyl chloride resin | 90 | 90 | 90 | 90 | 90 |
| MBS resin | 10 | 10 | 10 | 10 | 10 |
| Dibutyl tin dimaleate | 3 | 3 | 3 | 3 | 3 |
| Butyl stearate | 0.5 | 0.5 | 0.5 | 0.5 | 0.5 |
| Stearic acid | 0.3 | | | | |
| Stearyl alcohol | | | 0.3 | | |
| Polymerized fatty acid | | | | 0.3 | |
| Hydrogenated polymerized fatty acid | | | | | 0.3 |
| Polymerized fatty alcohol | | | | | 0.3 |
| Time till condition (A) occurred (min.) | <1 | <1 | 9 | 11 | 5 |
| Time till condition (B) occurred (min.) | <1 | <1 | 23 | 30 | 17 |

TABLE 3

|  | Control | | Example | | | |
|---|---|---|---|---|---|---|
| Number of sample | 11 | 12 | 13 | 14 | 15 | 16 |
| Composition of sample (g.): | | | | | | |
| Polyvinyl chloride resin | 85 | 85 | 85 | 85 | 85 | 85 |
| MBS resin | 15 | 15 | 15 | 15 | 15 | 15 |
| Dibutyl tin dimaleate | 3 | 3 | 3 | 3 | 3 | 3 |
| Methylenebisstearoamide | 0.5 | 0.5 | 0.5 | 0.5 | 0.5 | 0.5 |
| Ester wax [1] | 0.5 | | | | | |
| Butyl stearate | | 0.8 | 0.5 | | | |
| Polymerized fatty acid | | | | | | 0.5 |
| Hydrogenated polymerized fatty acid | | | | 0.5 | | |
| Polymerized fatty alcohol | | | 0.3 | | 0.5 | |
| Time till condition (A) occurred (min.) | 3 | 1 | 5 | 12 | 10 | 11 |
| Time till condition (B) occurred (min.) | 9 | 9 | 15 | 17 | 14 | 20 |

[1] Wax of montanic ester system.

The embodiments of the invention in which an exclusive property or privilege is claimed are defined as follows:

1. A moldable resin composition having improved releasing properties, said resin composition consisting essentially of a homogeneous mixture of
   (A) moldable synthetic resin containing at least 50 percent by weight of polyvinyl chloride and selected from the group consisting of polyvinyl chloride, copolymers thereof and blends thereof, and
   (B) from about 0.05 to 2.0 percent by weight, based on the weight of said resin, of at least one lubricant selected from the group consisting of
      (1) polymerized fatty acids consisting essentially of dimers of monobasic saturated or unsaturated fatty acids having from 8 to 24 carbon atoms
      (2) hydrogenated polymerized fatty acids consisting essentially of hydrogenated dimers of monobasic fatty acids having from 8 to 24 carbon atoms, and
      (3) polymerized fatty alcohols consisting essentially of dimers of alcohols having from 8 to 24 carbon atoms.

2. A composition according to claim 1, in which said fatty acids are unsaturated fatty acids having 18 carbon atoms.

3. A composition according to claim 1, in which said resin is selected from the group consisting of polyvinyl chloride resin, vinyl chloride-vinyl ester copolymers, vinyl chloride-vinyl ether copolymers, vinyl chloride-vinylidene chloride copolymers, vinyl chloride-lower olefin copolymers and blends of polyvinyl chloride resin with methylmethacrylate-butadiene-styrene resin, acrylonitrile-butadiene-styrene resin, styrene-acrylonitrile or polystyrene.

(References on following page)

References Cited

UNITED STATES PATENTS

| | | | |
|---|---|---|---|
| 2,630,441 | 3/1953 | Dazzi | 260—23 X A |
| 2,654,718 | 10/1953 | Grummit et al. | 260—23 X A |
| 2,507,143 | 5/1950 | Shaban | 260—45.75 R |
| 3,355,404 | 11/1967 | Ruffing | 264—300 |
| 3,400,087 | 9/1968 | Robb | 264—300 |
| 3,516,957 | 6/1970 | Gray | 264—300 |
| 3,442,837 | 5/1969 | Brotz | 264—300 |

OTHER REFERENCES

Schildknecht, "Polymer Processes," 1956, pp. 685 and 686.

DONALD E. CZAJA, Primary Examiner

W. E. PARKER, Assistant Examiner

U.S. Cl. X.R.

260—33.4 PO, 45.75 R, 407; 264—131, 300, 338